United States Patent [19]
Schilling, Jr.

[11] 3,751,977

[45] Aug. 14, 1973

[54] MATERIAL ANALYZING APPARATUS

[75] Inventor: Robert G. Schilling, Jr., Flushing, N.Y.

[73] Assignee: Chemical Instruments Corporation, Bayside, N.Y.

[22] Filed: Apr. 19, 1972

[21] Appl. No.: 245,574

[52] U.S. Cl. .................................. 73/101, 73/15.6
[51] Int. Cl. ........................................... G01n 3/32
[58] Field of Search ...................... 73/101, 15.6, 90, 73/99

[56] References Cited
UNITED STATES PATENTS

| | | | |
|---|---|---|---|
| 3,699,808 | 10/1972 | Ford et al. | 73/67.2 |
| 3,501,952 | 3/1970 | Gergen et al. | 73/67.2 X |
| 2,178,252 | 10/1939 | Forster | 73/67.2 |
| 2,593,389 | 4/1952 | Nielsen | 73/99 |

Primary Examiner—Jerry W. Myracle
Attorney—Harold D. Steinberg and Martin Blake

[57] ABSTRACT

An analyzing structure for determining properties such as elastic shear modulus and mechanical hysteresis of a material. A pair of mutually spaced holders hold the sample in such a way that the holders are interconnected by the sample, and these holders are in turn carried by driver and driven supports. A drive sets the driver support into vibratory motion so that the latter is transmitted through the sample to the driven support. By detecting the manner in which the driver and driven supports vibrate it is possible to determine properties of the sample. The sample is tested by cyclically generating substantially pure shear forces in the sample, with the power required to sustain the vibrations of the sample at a constant level being measured to determine the damping of the sample and the frequency of vibration being measured to determine the modulus of the sample.

11 Claims, 3 Drawing Figures

MATERIAL ANALYZING APPARATUS

BACKGROUND OF THE INVENTION

The invention relates to an apparatus for analyzing material.

In particular, the invention relates to an apparatus for determining stiffness and energy loss characteristics of a given material as a function of temperature or as a function of time at a given temperature.

It is conventional to analyze material in the above manner by way of a thermomechanical analyzer. The determination of the properties of the material is usually achieved by distorting a sample of the material and measuring the effect of the material on the energy injected into it with any of a number of available techniques.

While it is known that it is best to generate shear stresses in a sample in order to determine the properties thereof during thermomechanical analysis, it is not possible with known methods and apparatus to subject the sample which is analyzed to stresses in pure shear. The stressing of the sample with the known methods and apparatus are always accompanied by undesirable tensile or compressive forces which detract from the accuracy of the analysis and which increase the energy required to achieve the desired analysis. Thus, with known methods and apparatus it is unavoidable that the sample will be stressed in excess of an optimum amount.

A further drawback of the present state of the art resides in the fact that the analysis cannot always be carried out with the desired accuracy. Furthermore it is not possible with the known techniques to isolate the stresses to which the sample is subjected from the stresses in the structure which carries the sample.

SUMMARY OF THE INVENTION

It is accordingly a primary object of the present invention to provide an apparatus which will avoid the above drawbacks.

In particular, it is an object of the present invention to provide an apparatus capable of analyzing a sample by subjecting the latter almost entirely to shear stresses.

Furthermore it is an object of the present invention to provide an apparatus which is capable of analyzing a sample while preventing large distortions therein.

Also, it is an object of the invention to provide an apparatus which require very little energy in order to achieve the desired analysis.

Furthermore, it is an object of the invention to provide an apparatus which are capable of achieving a highly accurate analysis.

Also, it is an object of the present invention to provide an apparatus which are capable of reliably maintaining a resonant frequency of vibration in a structure which is in part composed of the sample which is tested.

In addition, it is an object of the present invention to provide an apparatus which are capable of maintaining constant all variables except the loss of energy resulting from testing of the sample.

Furthermore, it is an object of the invention to provide an analyzing structure which is simple and relatively inexpensive while at the same time being easy to operate and capable of achieving highly accurate results.

According to the invention the analyzer includes a pair of mutually spaced holding means for holding the sample which is to be analyzed with the sample extending between and interconnecting the pair of holding means. A driver support means carries one of the holding means to support the latter for vibratory movement while a driven support means carries the other of the support means to support the latter also for vibratory movement. A drive means is operatively connected with the driver support means for setting the latter into vibratory motion which is transmitted through the above one holding means to the sample and from the latter to the other holding means to vibrate the latter and the driven support means therewith. In this way the driver support means and the holding means carried thereby form a driver unit while the driven support means and the holding means carried thereby form a driven unit both of which are set into identical, in phase, resonant vibratory motion during operation of the drive means with the vibratory motion being transmitted to the driven unit through the sample. A detecting means coacts at least with the driven unit for responding to the vibratory motion thereof for determining properties of the sample which is under test.

BRIEF DESCRIPTION OF DRAWINGS

The invention is illustrated by way of example in the accompanying drawings which form part of this application and in which.

DESCRIPTION OF PREFERRED EMBODIMENTS

The drawings illustrate the invention in connection with a thermomechanical analyzer whose basic purpose is to determine the stiffness and energy loss characteristics of a material sample either as a function of temperature or as a function of time at a given temperature. This determination is usually achieved by distorting a sample of the material and measuring the effect of the distortion on the energy passing through the sample by way of any of a number of available techniques.

Figure 1:
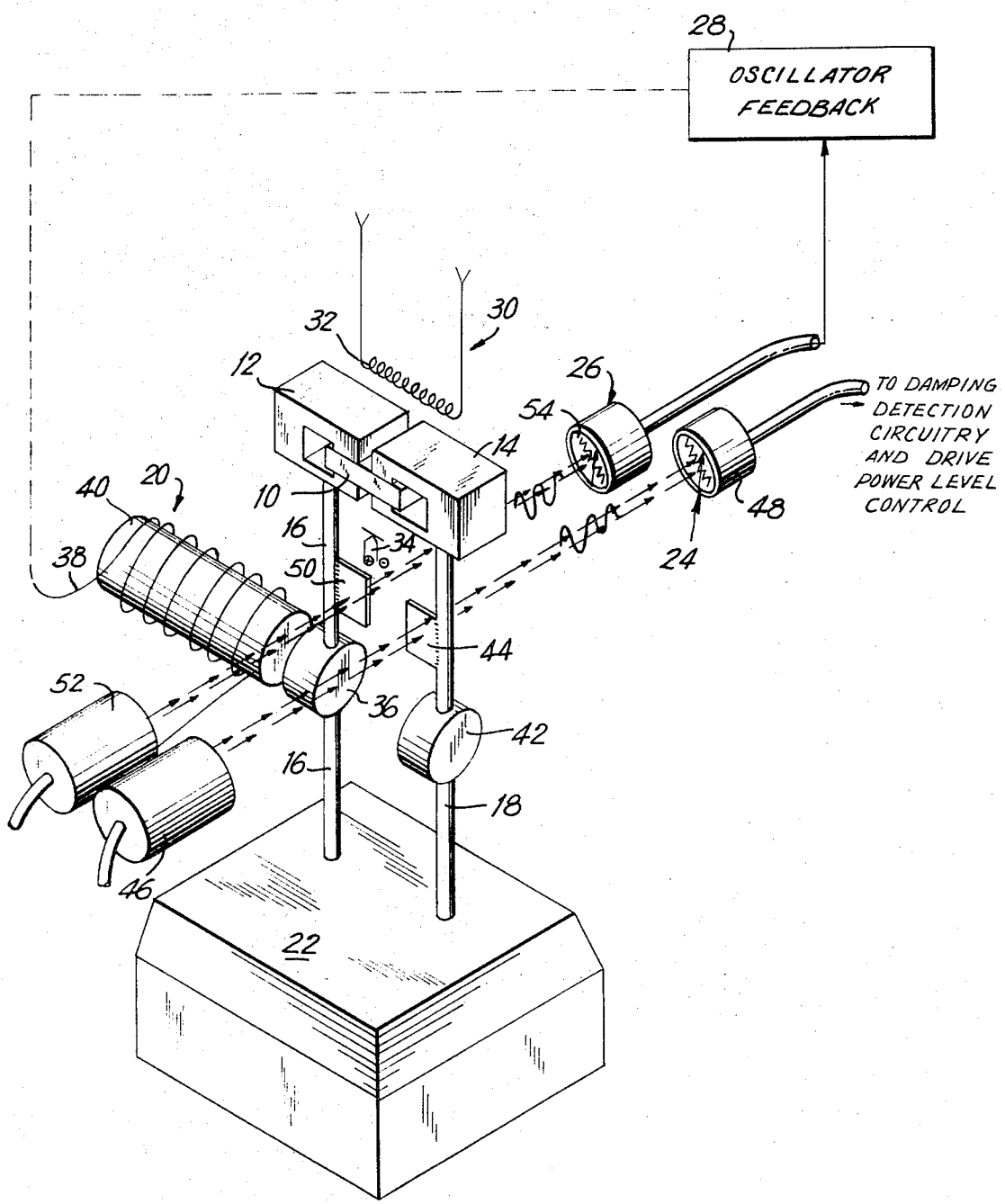
FIG. 1 is a schematic perspective illustration of one possible method and apparatus according to the invention.

Referring to FIG. 1, there is schematically illustrated therein a sample 10 which is to be analyzed. This sample is a body of any material which can be readily distorted, this material being any desired synthetic or natural material, or combination of synthetic and natural materials. Also it is possible for the sample under test to take the form of a highly viscous liquid.

The sample 10 is held by a pair of holding means 12 and 14 in the form of a pair of clamps which clamp the sample at spaced portions thereof for holding the sample. Thus, the pair of holding means 12 and 14 are nutually spaced while being interconnected by the sample 10 itself.

A pair of support means 16 and 18 respectively carry the holding means 12 and 14. The holding means 16 is a driver support means, driven by a drive means 20, described in greater detail below, so as to be set into vibratory motion, and the support means 18 forms a driven support means. The illustrated support means 16 and 18 take the form of a pair of identical upright springy tines carried by a common rigid base 22. Thus, the components 12 and 16 form a driver unit while the components 14 and 18 form a driven unit. The drive means 20 acts on the unit 12, 16 to set the latter into vibratory motion, and this vibratory motion is transmitted only through the sample 10 itself to the driven unit 14, 18 to set the latter into vibratory motion.

A detecting means 24 coacts with the driven unit 14, 18 for responding to the vibratory motion thereof in order to determine a property such as the hysteresis of the material which forms the sample 10. A second detecting means 26 coacts with the driver unit 12, 16 for responding to vibratory movement thereof, and in this way it is possible to achieve further information with respect to the sample 10. This second detecting means 26 is interconnected with the drive means 20 through an oscillator feedback means 28 which serves to control the drive means 20 so that through the latter the bent 16, 12, 10, 14, 18 is excited at its natural frequency to achieve a state of resonant vibration.

A temperature-regulating means 30 is provided for regulating the temperature of the sample. This temperature-regulating means 30 may include a suitable heating coil 32 and a thermocouple 34 which coacts with the heating coil 32 in order to maintain the sample at a selected temperature or in order to change the temperature of the sample. The sample may be situated within a suitable enclosed chamber which may be evacuated and which may have its interior atmosphere controlled as by supplying a suitable inert gas, for example, to the chamber in which the sample is situated, with the temperature of the interior of the chamber being controlled by the temperature-regulating means 30 which thus controls the temperature of the sample 10.

The drive means 20 includes a magnetic armature 36 carried by the springy tine 16 and acted upon by a magnetic field generated through a driver coil 38 and a slug 40 about which the coil 38 is wound. Thus, by transmitting a suitable drive signal to the coil 38 it is possible to set the tine 16 into vibratory motion. The pair of upright tines 16, 18 together with the pair of clamps 12, 14 and the sample 10 extending therebetween form a bent, and during operation of the drive means 20 this bent is maintained vibrating at its resonant frequency. The detecting means 26 by responding to the frequency of vibration of the tine 16 is capable of acting through the feedback means 28 on the drive means 20 to control the latter so as to maintain the bent vibrating at its resonant frequency.

The tines 16 and 18 as well as the clamps 12 and 14 are identical, and in order to maintain the identical relationship between this structure the tine 18 carries a compensating weight 42 which has the same mass as the armature 36. Furthermore, in order to reduce the influence of the carrying structure on the sample the tines and clamps may be cooled in any suitable way.

The detecting means 24 includes a light-chopping means 44 in the form of an opaque fin or plate which is fixed to and extends laterally from the tine 18 toward the tine 16. A regulated light-source means 46 also forms part of the detecting means 24. This light-source means 46 provides a beam of light which travels toward the light-chopping means 44 so as to be modulated thereby at a frequency equal to the frequency of vibration of the tine 18. A photosensitive means 48 is situated on the side of the light-chopping means 44 opposite from the light-source means 46 to receive the modulated light from the source 46 whenever the light-chopping means 44 is sinusoidally oscillated within the beam of light issuing from the source 46. In this way the photosensitive means 48 will receive a sinusoidal light signal at a frequency equal to the vibrating frequency of the tine 18, and at an amplitude proportional to the displacement so that this photosensitive means 48 forms a pick-up capable of transmitting a signal to oscillation amplitude control circuitry, as indicated schematically in FIG. 1.

The detecting means 26 is identical with the detecting means 24. Thus, the detecting means 26 includes a light-chopping means 50 which is identical with the light-chopping means 44. This light-chopping means 50 is thus in the form of a fin or plate which is fixed to and extends laterally from the tine 16 toward the tine 18. The detecting means 26 includes a light-source means 52 identical with the source means 46 and supplying a light beam which is modulated by the light-chopping means 50 at a frequency equal to the vibrating frequency of the tine 16. At the side of the light-chopping means 50 opposite from the light-source means 52 is a photosensitive means 54 which receives modulated light whenever the beam from the source 52 is sinusoidally obstructed by the chopper 50. Thus, the photosensitive means 54 also forms a type of photodetector which is capable of providing information with respect to the drive frequency required to drive the unit 12, 16, at its natural frequency and, as was pointed out above, it is also possible to use the detecting means for the purpose of achieving the feedback signal which controls the drive means 20 so as to maintain the bent vibrating at its natural frequency.

Thus, by injecting energy into the bent at its resonant frequency, in the manner described above, shear stresses are cyclically generated in the sample 10. These shear stresses are the type of stresses considered best for thermomechanical analysis. Under such cyclic stresses and their associated strains the sample 10 will dissipate or transfer the injected energy according to the hysteresis of the material, so that through the detecting means 24 it is possible to determine a property such as the hysteresis of the material.

In addition to changing the hysteresis or clamping effect, altering the temperature will cause the stiffness of the sample to change, and this temperature regulation can be brought about by the temperature-regulating means 30. The change in the stiffness resulting from temperature regulation manifests itself as a change in the resonant frequency of the bent. Thus, by altering the temperature with the regulating means 30 it is possible through the detecting means 26 to detect the change in resonant frequency of the bent and thus achieve in this way additional information with respect to the characteristics of the sample. It is to be noted that in the limiting case where the sample has zero stiffness the frequency of the bent approaches that of either tine with additional mass added to the top equal to one half the sample mass.

Figure 2A:
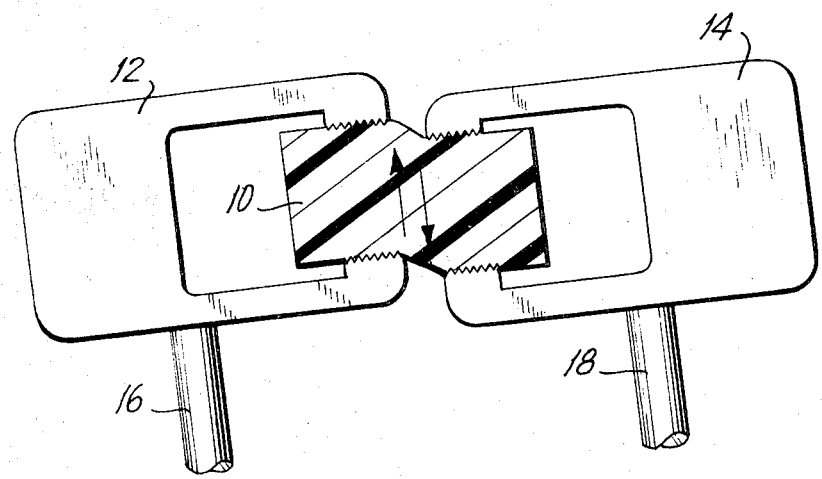
FIGS. 2A and 2B respectively illustrate extreme left and right positions of a sample during vibratory oscillation thereof together with structure which carries the sample, this structure which is in the immediate vicinity of the sample also being illustrated in FIGS. 2A and 2B.
Figure 2B:
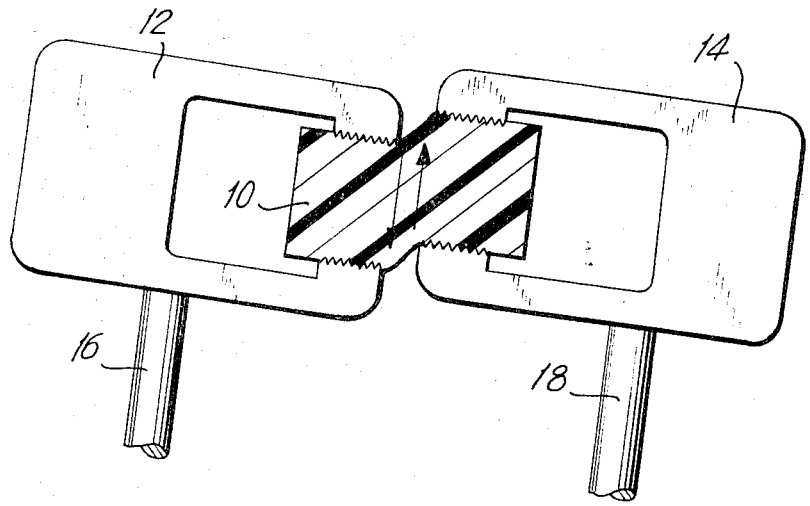

The manner in which shear forces are generated in the sample with the structure and method of the invention is illustrated in detail in FIGS. 2A and 2B which respectively illustrate the upper region of the bent at its extreme left and right positions. As is apparent from FIGS. 2A and 2B the clamps 12 and 14 remain at all times at a constant distance from each other. These clamps however shift angularly and in elevation with respect to each other so that at the extreme left position shown in FIG. 2A the left portion of the sample has been displaced upwardly while the right portion has been displaced downwardly, while in FIG. 2B the left portion of the sample has been displaced downwardly and the right portion of the sample has been displaced upwardly. In the neutral position shown in FIG. 1, where the upper portion of the bent is midway between the positions respectively shown in FIGS. 2A and 2B, the sample is in a horizontal attitude, assuming a straight configuration.

The result of this method and apparatus of the invention is that the sample is cycled about a point of zero stress situated at the center of the body which forms the sample. In this way it is possible to prevent large distortions of the sample by unidirectional forces (tensile or compressive) in the event that the material 10 becomes plastic or taffy-like in its behavior. Furthermore, with the method and apparatus of the invention very little energy is required to maintain the oscillation of the driven unit 14, 18. This type of operation thus results in an extremely small tensile stress component and, in effect, places the sample in almost pure shear. This behavior can be illustrated by the fact that a material may be analyzed at a temperature above the softening point with the method and apparatus of the invention without being pulled apart.

Control of the oscillating tines and measurement of the stiffness and loss parameters are achieved by way of the chopped light beams, as described above. Each beam is modulated by the chopping means carried by one of the tines with the amplitude of the resulting signal being proportional to the excursions of the associated tine.

The photodetector activated by the driver support means 16 functions in connection with the feedback means 28 to utilize the driver tine 16 as a frequency control element for the oscillator from which the signal is transmitted to the electromagnetic drive means 20, so that in this way it is possible to control the entire system. Thus with the method and apparatus of the invention the bent is always excited by energy having a frequency equal to the natural frequency of the bent. The frequency of the applied power is continuously read out so as to yield the required stiffness output data.

The remaining photodetector 48 is of course activated by the vibration of the driven tine 18. Inasmuch as the tines are kept cool during a test their physical characteristics are maintained constant. As a result all of the energy required to sustain the oscillation of the driven tine 18 at a constant amplitude must be transmitted through the sample 10. This operation renders the loss of energy generated by the sample proportional to the power required by the electromagnet 38, 40 to maintain the oscillation of the driven tine 18, and thus of the entire bent, at a constant value. Continual readout of this power level is all that is required to achieve the necessary loss data of the sample.

It is to be noted that it is not essential to have a pair of detecting means respectively coacting with the driver and driven units to detect the vibration thereof. Thus, the construction shown in FIG. 1 may be modified by eliminating the source 46 and pick-up 48 and all of the circuitry connected thereto. This latter circuitry can instead be supplied with signals from a single pick-up 26 which would form the only detecting means of the entire structure with the source 52 forming the only light source for the entire structure. Components 42 and 44 would be retained only to maintain the driven unit identical with the driving unit. All signals and controls would thus be derived from the single detecting means 54. This can be done because when the bent vibrates the driven unit vibrates synchronously, in phase with the driver unit, so that both units have identical vibrations, thus eliminating all except shear stresses in the sample. Because of the identical, in-phase vibrating movements of the driver and driven units it is possible to derive all data and controls with the single detecting means which coacts with the driver unit.

What is claimed is:

1. In an analyzer, a pair of mutually spaced holding means for holding a sample which is to be analyzed with said sample extending between and interconnecting said pair of holding means, driver support means carrying one of said holding means to support the latter for vibratory movement and driven support means carrying the other of said holding means to support the latter also for vibratory movement, drive means operatively connected with said driver support means for setting the latter into vibratory motion which is transmitted through said one holding means to said sample and from the latter to said other holding means to vibrate the latter and said driven support means therewith, whereby said driver support means and said one holding means, on the one hand, and said driven support means and said other holding means, on the other hand, form driver and driven units which are set into vibratory motion when said drive means operates with a vibratory motion being transmitted to said driven unit through said sample, and detecting means coacting with at least one of said units for responding to vibratory motion thereof for determining properties of the sample which is under test.

2. The combination of claim 1 and wherein said units operate on said sample to cyclically generate shear stresses therein.

3. The combination of claim 1 and wherein a temperature-regulating means coacts with said sample for regulating the temperature thereof.

4. The combination of claim 1 and wherein a second detecting means coacts with the other said units for responding to vibratory motion thereof for providing additional information with respect to the sample.

5. The combination of claim 4 and wherein a feedback means is operatively connected between said second detecting means and drive means for controlling the latter to maintain said driver unit in a state of resonant vibratory movement.

6. The combination of claim 1 and wherein said driver and driven support means respectively have the construction of a pair of identical upright springy tines, said pair of holding means respectively having the construction of a pair of identical clamps respectively carried by said tines and interconnected by said sample which is clamped by said clamps.

7. The combination of claim 6 and wherein a base is common to and carries said tines and is of sufficient mass and stiffness to prevent flexure of said base during vibratory movement.

8. The combination of claim 1 and wherein said detecting means includes a light-chopping means carried by said driven support means for movement therewith for modulating a light beam with a frequency determined by the vibratory motion of said driven support means, light-source means for directing toward said light-chopping means a light beam to be modulated thereby, and photosensitive means situated at the side of said light-chopping means opposite from said light source for responding to the modulation of the light beam by said light-chopping means to detect the vibratory motion of said driven support means.

9. The combination of claim 8 and wherein a second detecting means identical with said first-mentioned detecting means coacts with said driver support means for detecting the vibratory motion thereof.

10. The combination of claim 1 and wherein said detecting means forms the only detecting means of the analyzer, whereby there is no detecting means coacting with the other of said units.

11. The combination of claim 10 wherein said one unit is the driver unit.

* * * * *